United States Patent [19]

Pomroy et al.

[11] Patent Number: 4,886,948
[45] Date of Patent: Dec. 12, 1989

[54] PORTABLE TURNTABLE WITH SHIELDED DRIVE MOTOR FOR MICROWAVE OVENS

[75] Inventors: James F. Pomroy, St. Paul, Minn.; Albert E. Colato, Valencia, Calif.

[73] Assignee: Plastics, Inc., St. Paul, Minn.

[21] Appl. No.: 336,084

[22] Filed: Dec. 31, 1981

Related U.S. Application Data

[60] Division of Ser. No. 131,505, Mar. 18, 1980, Pat. No. 4,330,696, which is a continuation-in-part of Ser. No. 897,048, Apr. 17, 1978, abandoned.

[51] Int. Cl.⁴ .................. H05B 6/80; A47B 11/00
[52] U.S. Cl. .................. 219/10.55 F; 219/10.55 E; 99/443 R; 108/20
[58] Field of Search .................. 219/10.55 F, 10.55 E, 219/10.55 R, 10.55 D, 10.55 M; 99/423, 427, 443 R, 449; 126/338; 108/139, 142, 20; 312/11, 305; 211/144, 163; 248/389, 522; 274/9 R; 185/38, 39; 174/35 MS, 35 R; 310/85, 89

[56] References Cited

U.S. PATENT DOCUMENTS

| | | | |
|---|---|---|---|
| 176,590 | 4/1876 | Brigham | 185/39 X |
| 274,009 | 3/1883 | Maranville | 126/338 |
| 557,344 | 3/1896 | Shaw | 126/338 |
| 795,806 | 8/1905 | Adelhelm | 185/39 |
| 2,897,746 | 8/1959 | Hilgers | 99/443 |
| 3,177,335 | 4/1965 | Fitzmayer et al. | 219/10.55 F |
| 3,320,396 | 5/1967 | Boehm | 219/10.55 B |
| 3,428,772 | 2/1969 | Wallenfels | 219/10.55 E |
| 3,440,385 | 4/1969 | Smith | 219/10.55 R |
| 3,604,783 | 9/1971 | Roth | 219/10.55 D X |
| 3,640,142 | 2/1972 | Stafford et al. | 74/112 |
| 3,731,037 | 5/1973 | Levinson | 219/10.55 E |
| 3,812,316 | 5/1974 | Milburn | 219/10.55 D |
| 3,854,021 | 12/1974 | Moore et al. | 219/10.55 F |
| 3,909,574 | 9/1975 | Muller et al. | 219/10.55 A |
| 4,003,368 | 1/1977 | Maxel | 219/10.55 E |
| 4,036,151 | 7/1977 | Shin | 219/10.55 R |
| 4,038,510 | 7/1977 | White | 219/10.55 E |
| 4,053,730 | 10/1977 | Baron et al. | 219/10.55 F |
| 4,092,512 | 5/1978 | Suzuki et al. | 219/10.55 Z |
| 4,121,078 | 10/1978 | Takano et al. | 219/10.55 F |
| 4,137,442 | 1/1979 | Tateda | 219/10.55 D X |
| 4,210,794 | 7/1980 | Oguri | 219/10.55 F |
| 4,216,727 | 8/1980 | Cunningham | 108/20 |
| 4,239,009 | 12/1980 | Cunningham | 108/20 |
| 4,254,319 | 3/1981 | Beh et al. | 219/10.55 F |
| 4,258,630 | 3/1981 | Jorgensen et al. | 108/20 |
| 4,330,696 | 5/1982 | Pomroy et al. | 219/10.55 F |

FOREIGN PATENT DOCUMENTS

| | | | |
|---|---|---|---|
| 51-3146 | 1/1976 | Japan . | |
| 150557 | 12/1976 | Japan | 219/10.55 F |
| 92454 | 7/1977 | Japan | 219/10.55 F |
| 128141 | 9/1977 | Japan | 219/10.55 F |
| 10193 | of 1897 | United Kingdom . | |

Primary Examiner—Philip H. Leung

[57] ABSTRACT

Portable turntable for rotating food in a microwave oven, including a self-contained motor which drives a rotatable platform upon which the food is mounted. The turntable is made of a material having a low loss tangent at microwave frequencies, and the drive motor is surrounded by a shielding enclosure which reflects microwaves.

10 Claims, 3 Drawing Sheets

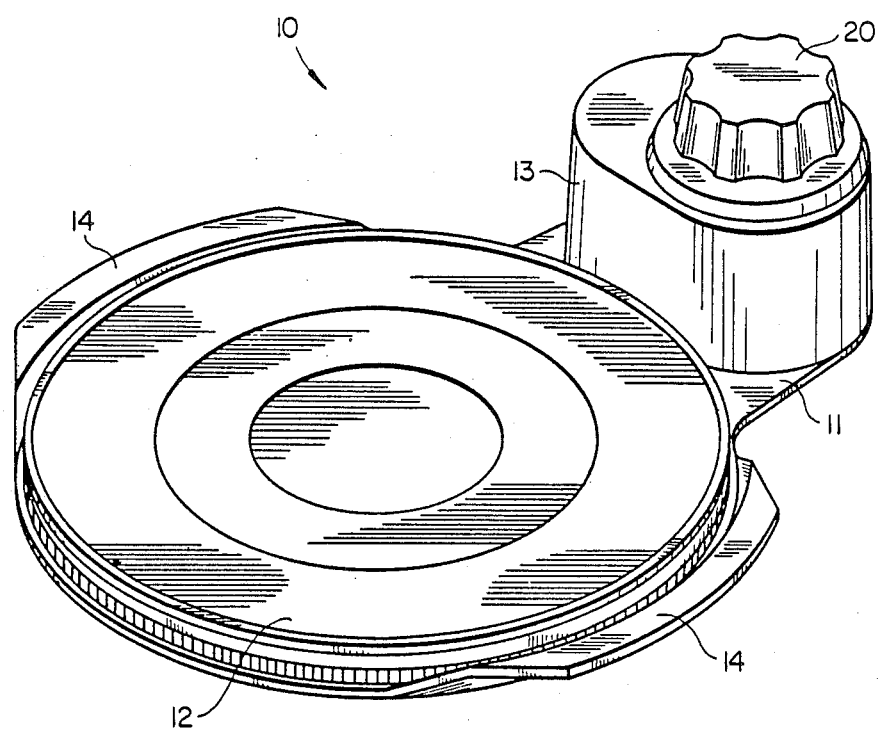
FIG_1
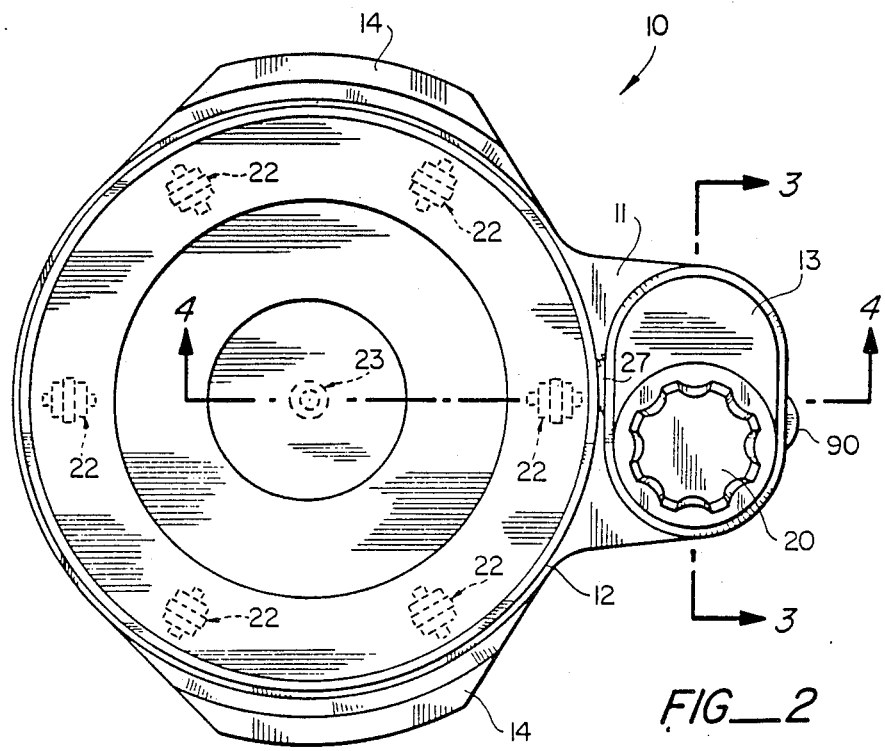
FIG_2

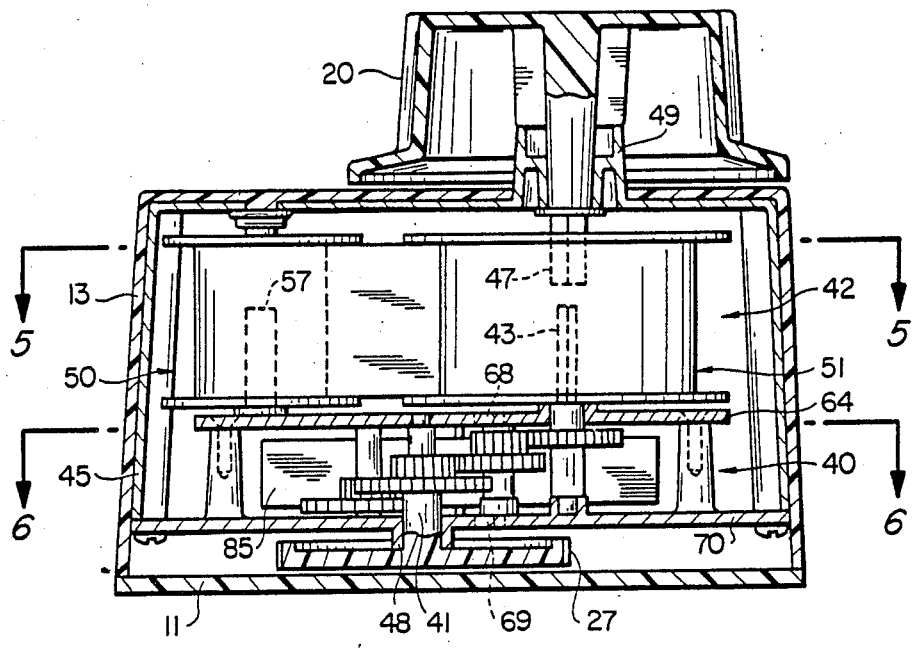
FIG_3
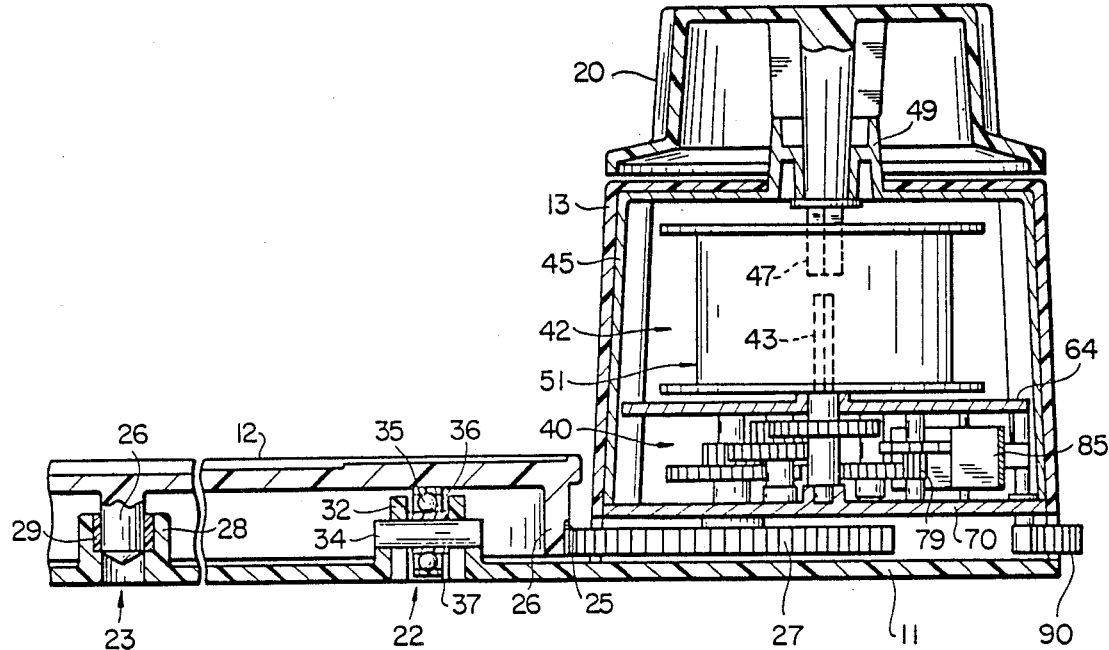
FIG_4

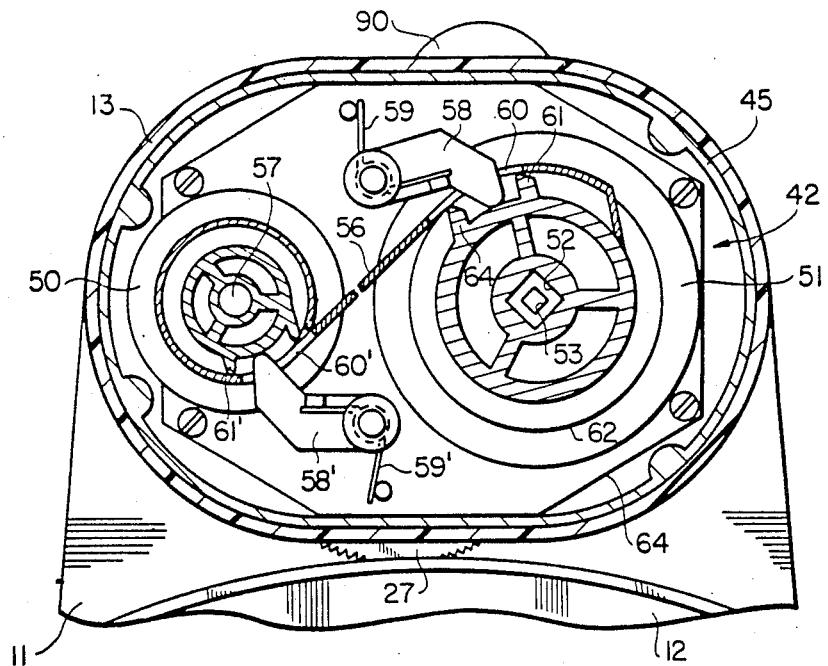
FIG_5
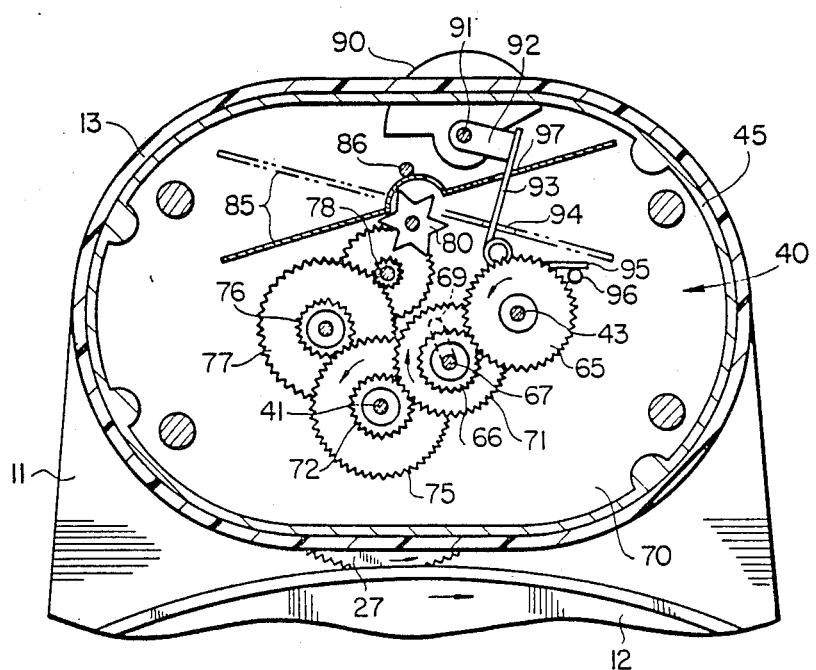
FIG_6

PORTABLE TURNTABLE WITH SHIELDED DRIVE MOTOR FOR MICROWAVE OVENS

This Application is a division of Ser. No. 131,505, filed Mar. 18, 1980, U.S. Pat. No. 4,330,696; a continuation-in-part of Ser. No. 897,048, filed Apr. 17, 1978 abandoned.

This invention relates to turntables for rotating articles being heated in ovens, and more particularly to a turntable for rotating food being heated within a microwave oven so as to uniformly cook the food.

In order to properly cook most foods, it is necessary to heat the foods uniformly. Due to uneven energy distribution in microwave ovens, frequently some portions of a dish may be overcooked while other portions remain uncooked.

When cooking with microwave ovens, food is placed in a microwave cavity which is essentially a six-walled box. Microwave energy injected into the box is reflected from the walls in a pattern forming cold spots where the microwave fields are partially cancelled and hot spots where the microwave fields reinforce. The action of the mode stirrer within the box and the location of the hot and cold spots tends to differ between ovens even when the ovens are made in the same production run of a given model because even slight changes in dimensions can affect the location of the cancelling and reinforcing microwave fields.

The location of hot and cold spots also changes with the nature of objects placed within the oven. Consequently, changing the food placed in the oven and/or the dish holding the food will shift hot and cold spots. Accordingly, even if the person cooking knows where hot spots are for a given portion of food within a given dish or container, this knowledge will not necessarily help once the food and/or container are changed. This is readily seen because in order to cook, food must absorb microwave energy reflecting within the oven, and different foods having different dimensions will absorb some of reflected waves and not others. Consequently, in some situations reflected microwave fields may be available for reinforcement whereas in other situations these microwave fields may have been cancelled or absorbed. Containers can have dielectric constants greater than air, thereby changing the effective size of the oven as sensed by the microwave fields by loading the oven with high dielectric constant material and changing the path of microwave fields in the oven by channeling microwave fields through the container instead of through the air.

Manufacturers of microwave ovens recognize that non-uniform heating is a problem. Consequently, instructions included with many microwave ovens instruct the users to turn the food at certain intervals which may be, for example, one, two, three or five minutes depending on the nature of the food being cooked. In order to obviate this inconvenience, there are now microwave ovens available with built-in turntables that slowly rotate food being cooked. U.S. Pat. No. 3,182,166 is exemplary of a microwave oven having such a turntable. There are, however, millions of microwave ovens already in the hands of consumers which do not have turntables. Furthermore, for one reason or another, most of the microwave ovens currently being manufactured and sold do not have turntables. Accordingly, there is a great need for a turntable which can be purchased as an accessory so as to enhance the convenience and desirability of the microwave ovens currently in use and now being manufactured and sold which do not have built-in turntables.

If one is to provide a turntable for use as an accessory for household microwave ovens, there are numerous considerations which must be taken into account in order that the turntable be both beneficial and safe. A primary consideration is that the turntable be constructed of materials and in a manner compatible with the operating environment of a microwave oven.

The problem is especially acute with a microwave oven because the oven must remain sealed in order to prevent excessive leakage of microwave energy which is a potential health hazard. Accordingly, in addition to a portable turntable for use in a microwave oven, there is a need for a self-contained power source which can fit into the oven to drive the turntable without having to be connected in some manner to an outside power supply.

In view of the aforementioned shortcomings of the prior art, it is an object of the invention to provide a new and improved turntable for use in microwave ovens.

It is a further object of the invention to provide a turntable for microwave ovens wherein oven walls are not breeched in order to transmit power to the turntable. It is a further object of the invention to provide a turntable which is so constructed and configured that it minimally interferes with the operation of microwave ovens.

It is a further object of the invention to provide a turntable having a configuration and dimensions which are suitable for most microwave ovens already sold or being manufactured and sold which are not integrally equipped with turntables.

With these and other objects in mind, the invention provides a turntable having a rotating platform fabricated of a material having a relative low dielectric constant, upon which food to be heated is placed. The platform is driven by a motor through a train of gears, with both the motor and the gears being housed in a shielding enclosure to prevent the entrance of microwave energy therein. The final driving gear is outside the shield and, like the platform, is made of a material which has a relatively low dielectric constant.

FIG. 1 is a perspective view of a turntable according the the invention;

FIG. 2 is a top plan view of the turntable shown in FIG. 1;

FIG. 3 is a cross-sectional view taken along line 3-3 of FIG. 2, showing the drive motor of the turntable;

FIG. 4 is a cross-sectional view taken along line 4-4 of FIG. 2, showing how the motor drives the rotating platform of the turntable;

FIG. 5 is a cross-sectional view taken along 5-5 of FIG. 3, showing the construction of the drive motor; and FIG. 6 is a cross-sectional view taken along line 6-6 of FIG. 3, showing a gear train which is driven by the motor and couples the motor to the rotating platform.

Referring now to FIG. 1 there is shown a turntable designated generally by the numeral 10 which includes a supporting base 11 upon which a rotatable platform 12 and spring motor housing 13 are mounted. The base 11 includes a pair of handles 14 projecting from opposite sides thereof for carrying the turntable.

The turntable 10 is configured as a self-powered accessory which can be purchased separately from and used within most microwave ovens not having a turntable integral therewith. The spring motor within the spring motor housing 13 is wound by a winding knob 20 on the top of the housing, preferably before the turntable is placed in the oven. Upon placing the turntable within an oven and starting operation of the motor, the door may be closed without any portion of the accessory extending outside of the oven. This is extremely important with microwave ovens in order to avoid excessive leakage of microwave energy out of the oven so as to expose people to the energy level which is believed to constitute a health hazard. The spring motor is a relatively large concern and therefore can alter the microwave pattern within the oven. Accordingly, the turntable 10 positions the spring motor off to the side of the rotary platform 12 instead of beneath the platform. Consequently, the spring motor will be positioned adjacent to an inner wall or corner of the oven where its adverse effect on the microwave pattern is minimized.

In order to minimize the effect of the turntable on the environment of microwave ovens, the base 11, platform 12, housing 13 and knob 20 are made of a non-metallic, non-conductive material which has a low loss tangent at microwave frequencies. One preferred material is a modified thermoset polyester such as used in MICROWARE cookware developed by the Plastics, Inc., a subsidiary of Anchor Hocking Corporation. This material is not only non-microwave interactive and heat resistive but is also resistant to various chemicals and detergents in which cookware and kitchen appliances are frequently washed. This material is further advantageous in that it does not deform when exposed to relatively high heat, such as than encountered in conventional ovens, and therefore retains its mechanical properties so that moving mechanical elements made therefrom will continue to operate in a high heat environment. Furthermore, a modified polyester will readily accept a variety of colors so that turntables made therefrom can have a pleasing appearance which of course enhances their commercial appeal. In essence, the modified polyester is a preferable material because it has a low dielectric constant so that microwave interaction is minimized. In addition, this material has sufficient high heat resistance to withstand prolonged exposure to temperatures approximately 500° F.

As defined herein, "non-microwave interactive material" means a material which does not substantially affect the microwave fields within the cavity. Such materials typically have a dielectric constant of less than about 4 at the frequency of operation of the oven, i.e., 2450 MHz, and a low loss tangent at microwave frequencies.

Referring now to FIG. 2 where the turntable 10 is shown in a plan view, it is seen that the rotatable platform 12 is supported on the base 11 by a plurality of spaced ball bearing assemblies 22 and a sleeve bearing assembly 23. Ball bearing assemblies 22 are designed to support a food load of approximately 15 pounds while the sleeve bearing assembly 23 positions the platform 12 on the base 11. Referring now to FIG. 4 as well as FIG. 2, it is seen that the platform 12 has outwardly facing gear teeth 25 formed in a downwardly projecting rim 26 which mesh with a final drive gear 27 projecting from the motor housing 13. As seen in FIG. 4, the bearing assembly 23 includes an upwardly projecting hollow bore 28 which includes a bearing surface liner 29 that receives an axle 26 projecting from the platform 12. The bearing assembly 23 limits lateral movement of the platform 12 and thus keeps the gear teeth 25 in engagement with the final drive gear 27. If one desires to wash the platform 12 because, for example, food has been spilled on the platform, the platform is simply lifted up vertically off the ball bearing supports 22 disengaging the axle 26 from the bore 28. Since the platform 12 is made of a material such as a modified polyester, it can be washed with most household cleaners without any ill effects.

Referring now specifically to the ball bearing assemblies 22, it is seen that each assembly 22 includes a pair of spaced flanges 32 between which inner and outer ball bearing races 36, 37 are mounted, with a plurality of balls 35 between inner and outer races. The inner race 36 is mounted on a radially extending axle 34 while the outer race 37 is in rolling engagement with the platform.

As with other portions of the turntable 10, it is necessary for the bearing assemblies to be made of a microwave compatible material which will not interact with microwaves in a microwave oven. It is also necessary for balls 35 to be relatively strong since they support a load while they rotate. Preferably, the balls are made of borosilicate glass 7 and races 36, 37 are made of a plastic. The plastic must also be a low dielectric material and may be made from an injection moldable polyamide or polyphenylene sulfide material. Likewise, it is preferable to make the axles 34 of a non-metallic material such as a modified thermoset polyester. By using non-metallic material throughout the bearing assemblies 22, one also eliminates the possibility of arcing between any of these elements and other metal objects which may be placed in microwave ovens.

Referring now to the sleeve bearing assembly 23, it is also desirable to make all elements of the sleeve assembly from microwave compatible, heat resistant materials. The bore 28 and axle 26 are integral with the base 11 and rotatable platform 23, respectively, and are made of a material such as a modified polyester. However, the insert 29 should be made of a material which is of relatively low friction as well as being microwave compatible and heat resistant. A suggested material is Rulon sold by the Dixon Corporation which is a fiberglass reinforced PTFE (teflon). An alternate material for the sleeve bearing could be an injection moldable polyamide compounded with a PTFE filler for lubricity reasons.

As is seen in FIGS. 2-6, the final drive gear 27 projects out of the housing 13 and is therefore not shielded by the housing 13. Accordingly, the gear 27 is made of a microwave compatible heat resistant material such as a modified polyester or polyphenylene sulfide and is connected to a gear train 40 within the housing via a shaft 41. The gear train 40 is in turn connected to a spring motor 42 via a shaft 43.

Since the spring motor 42 and gear train 40 are made of a metallic material, they should be shielded from the microwave fields in the oven. This is accomplished by mounting the motor 42 and gear train 40 within a metallic enclosure 45 that reflects microwave fields. As is seen in FIG. 3, the shaft 41 of the final drive gear 27 and a shaft 47 from the winding knob 20 project into the housing 13 and shielding enclosure 45 through cut-off tubes 48 and 49, respectively. The winding tubes 48 and 49 are cut-off tubes in that they are smaller in diameter than the smallest diameter that will propagate microwave fields at the frequency of operation of the oven. The cut-off tube 48 and 49 leak a small amount of energy by a principle other than propagation and the amount of leakage is a function of the microwave frequency, and dielectric material inside the tube, the diameter of the tube and the length of the tube. In any event, the cut-off tubes which are integral with shielding enclosure 45 prevent microwave energy within the oven from becoming involved with the motor 42 and the gear train 40.

In order to perform satisfactorily as a turntable within a microwave oven, the turntable 10 must, for example, be able to rotate a 15 pound load for approximately one-half hour at a rate of about 0.6 revolution per minute. The winding force required by the motor should not be so great that the average householder would have difficulty rotating the winding knob 20. According to the instant invention, a motor providing about 5 inch pounds of torque will provide sufficient output to rotate the desired load, at the desired speed.

The motor 42 is preferably a constant torque spring motor which utilizes a take-up drum 40 and an out-put drum 51. The output drum 51 has an upper "input" opening 52 which is square in cross section and receives the square shank of a shaft 47 connected to a knob 20 and a lower "output" opening 53 which is also square in cross section and receives the square shank of the shaft 43 connected to gear train 40. Accordingly, rotation of the winding knob 20 will rotate the drum 51 and rotation of the drum 51 rotates the shaft 43. A stainless steel spring 56 is anchored to the drum 51 and freely coiled about the take-up drum 50 which is itself freely rotatable about an axle 57. As the winding knob 20 is turned so as to rotate the drum 51 clockwise in FIG. 5 the coil spring 56 is progressively transferred from take-up drum 50 to the output drum 51. As the coil spring 56 is transferred, it is first pulled straight as it traverses the space between the drums and is wrapped backwards counter to its relaxed configuration around the output drum. Upon releasing the output drum by disengaging a detent as will be explained hereinafter, the coil spring 56 rewinds around the take-up drum and while so doing applies a substantially tangential force to the output drum 51 so as to rotate the output drum. In order to prevent over travel of the spring 56 on either the take-up rum 50 or output drum 51, a pawl 58 is urged by torsion spring 59 through a slot 60 near the end of the spring 56 to engage a shoulder 61 beneath the winding surface 62 of the output drum. As the spring 56 is wound on the output drum 51 and pawl 58 is cammed out of the slot 60 in the spring 56 by a cam 64 and thereafter rests on top of the spring 56. When the spring 56 is completely unwound, the pawl 58 drops back into engagement with the shoulder 61. Take-up drum 50 is likewise equipped with a pawl 58' urged by a torsion spring 59' through a slot 60' in the spring 56 to engage a shoulder 61' beneath the winding surface onto the take-up reel 50. As the spring 56 is recoiled onto the take-up reel 50, the pawl 58' is cammed out of the slot 60'.

By mounting the idler gears 66 and 71 so as to move in the slots 68 and 69, the idler gear 71 disengages from output gear 72 when the drive gear 65 is rotated in the clockwise direction upon winding the spring 56 on the drum 51. This is because the shaft 67 is moved to the top of the slot 69 (as seen in FIG. 6) so that the teeth on gear 71 are spaced from the teeth on gear 72. Upon releasing the gearing for rotation as the spring 56 unwinds, the drum 51 and drive gear 65 rotate in the counterclockwise direction which urges the idler gears 66 and 71 downwardly and moves the shaft 67 to the bottom of the slot 69 (as seen in FIG. 6). This causes the gear 71 to mesh with output gear 72 so as to drive final drive gear 27.

In order to control the rate at which the gear train transmits torque from the spring motor 42 to the platform 12, the gear train 40 is equipped with a governor which acts directly on the output shaft 41 through a gear 75 which is coaxial with output gear 72 and rigidly connected to the output shaft 41. The gear 75 meshes with an idler gear 76 that in turn is rigidly coaxial with a gear 77 meshed with idler gear 78. The idler gear 78 meshes with a star wheel gear 79 (see FIG. 4) which is rigidly coaxial with a star wheel 80. As the star wheel 80 rotates it engages a governor plate 85 which is mounted on a shaft 86 and rocks back and forth between the solid line position and the dotted line position. The rate at which the governor plate 85 rocks depends upon the length and mass of the governor plate as well as the torque imparted to the governor plate by the star wheel 80. The rate at which plate 85 oscillates therefore determines the rate at which the star wheel 80 rotates and thus the rate at which output shaft 41 which drives the gear 27 rotates. In essence, the star wheel and governor plate form an escapement which operates in a fashion somewhat similar to the escapement used in spring powered timepieces.

In order to hold the spring motor 42 in its wound mode so that it can be released to drive the platform 12 at a convenient time, a rotary on-off switch 90 is provided. The on-off switch 90 is mounted on a rotary shaft 91 which as a cam 92 thereon which engages one leg 93 of a torsion spring 94 that has a second leg 95 engaged with a boss 96 projecting from the bottom plate 70 of the shielding enclosure 45. The leg 93 of the torsion spring 94 passes through a slot 97 in the governor plate 85. In the on position, which is shown in FIG. 6, cam 92 positions the leg 93 so that it does not engage the edge of the slot 97 in the governor 85 thereby allowing the governor 85 to rock or oscillate back and forth. In the off position, the cam 92 releases the leg 93 of the torsion spring 94 so that the leg bears against the edge of the slot 97 thereby preventing the governor plate 85 from rocking about its axis which coincides with shaft 86. In essence, when the governor plate 85 is free to move under the influence of star wheel 80, the wound spring 56 is free to transmit torque through output shaft 41 to the rotary platform 12 via the final drive gear 27.

In order for the motor 51 to deliver the requisite torque for the desired period of time, the gear train 40 is designed with a ratio from the motor output shaft 43 to the gear train output shaft 41 of approximately 2.95–2.97 to 1. The torque on the output shaft 41 is the inverse of this ratio or is approximately 5 inch pounds divided by 2.97 or approximately 1.7 inch pounds. Since the rotation of drum 51 is limited by the governor plate 85 to approximately one revolution per minute, the final drive gear 27 rotates at approximately three revolutions per minute. In order to rotate the rotary platform at approximately 0.6 revolutions per minute, the rotary platform will have a diameter approximately five times that of final drive gear 27.

In order to achieve these rotational speeds, the star wheel rotates at a speed in approximately the range of 160:1 with respect to the drum 51 and its associated shaft 43 and drive gear 65. This results in a torque at the star wheel of approximately 1/160th of 5 inch pounds or approximately 0.2 inch pounds which is sufficiently low to minimize wear in the gear train 40 as well as on the governor plate 85.

Since the gears composing the gear train 40 are within the shielded enclosure 45, they may be made of any convenient material. A preferable material for the gearing is powdered metal which is relatively inexpensive to produce and wears well. The governor plate 85 is preferably made of stainless steel or another material such as steel plated with a corrosion resistant material.

In addition to the materials previously disclosed, base 11, platform 12 and other portions of the turntable can be fabricated of materials such as polysulfone, thermoplastic polyesters, polypropylene, polycarbonate, polystyrene, acrylonitrile, butadiene styrene, polyphenylene oxide, acrilic, and polyethylene. These materials all have relatively low dielectric constants so as not to interact with microwave patterns within the oven but are not as resistant to high temperatures as the materials previously disclosed.

It is apparent from the foregoing that a new and improved turntable for microwave ovens has been provided. While only certain presently preferred embodiments have been described, as will be apparent to those familiar with the art, certain changes and modifications can be made without departing from the scope of the invention as defined by the following claims.

What is claimed is:

1. In a portable turntable for rotating a food product in the cavity of a microwave oven: a base which rests on the floor of the oven cavity, a platform rotatably mounted on the base, a metal housing forming a microwave-tight enclosure mounted on the base, an aperture formed in one wall of the housing and being of a size sufficiently small to prevent propagation of microwave energy into the housing, a metallic drive spring enclosed within the housing, and an output member rotatably driven by the drive spring and extending through the aperture in driving connection with the platform, said base, said platform and said output member each being fabricated of a material having a low loss tangent at microwave frequencies.

2. In a portable turntable for use in a microwave oven,
   (a) a base having a flat bottom and a generally upright side wall,
   (b) a platform disposed in covering position over the base rotatably mounted to the base,
   (c) a metal housing fixedly connected to the base,
   (d) a motor enclosed within the housing and having a metallic drive spring with a driving connection with the platform to rotate said platform,
   (e) said base, platform and driving connection being formed of a dielectric material,
   (f) means for winding the spring to energize the motor,
   (g) said metal housing being relatively smooth and unencumbered with sharp edges throughout its entire exterior surface, and
   (h) an aperture in said metal housing through which the driving connection extends, said aperture being of a size sufficiently small to effectively eliminate microwave energy from the interior of said housing.

3. In a portable turntable for use in microwave ovens to rotate a container containing a food product cooked within the oven,
   (a) a base,
   (b) a rotatable member disposed over the base rotatably mounted to the base,
   (c) a metal housing mounted on the base,
   (d) a motor enclosed within the housing and having a metallic drive spring with a driving connection with the rotatable member to rotate said member,
   (e) said base, rotatable member and driving connection being formed of a dielectric material,
   (f) means for winding the spring to energize the motor,
   (g) said metal housing being relatively smooth and unencumbered with sharp edges throughout its entire exterior surface, and
   (h) an aperture in said metal housing through which the driving connection extends, said aperture being of a size sufficiently small to effectively eliminate microwave energy from the interior of said housing.

4. Apparatus for moving food in a microwave oven, comprising: a drive motor positioned within the oven cavity, a shielding enclosure enclosing the drive motor on all sides and shielding the motor from microwave energy in the oven cavity, a movable output member mounted within the oven cavity outside the shielding enclosure, and means for transmitting motion from the drive motor to the output member.

5. The apparatus of claim 4 wherein the output member comprises a horizontally extending turntable platform mounted for rotation about a vertical axis.

6. The apparatus of claim 4 wherein the drive motor, the shielding enclosure and the output member form a unitary structure which is removably mounted in the oven cavity.

7. A portable, self-contained turntable for use in a microwave oven, comprising a rotatively mounted food supporting platform of microwave compatible material, a drive motor operably connected to the platform for rotating the same about an axis, said drive motor being positioned entirely within the oven cavity when the turntable is in use, and a shielding enclosure enclosing the drive motor on all sides and shielding the motor from microwave energy in the oven cavity, said turntable constituting a complete selfcontained unit which can be inserted into and removed from the oven cavity as a unitary structure.

8. A portable, self-contained turntable for use in a microwave oven, comprising a base which rests on the floor of the oven cavity, a food supporting platform rotatively mounted on the base, a drive motor operably connected to the platform for rotating the same about an axis and being positioned totally within the oven cavity when the turntable is in use, and a shielding enclosure enclosing the drive motor on all sides and shielding the motor from microwave energy in the oven cavity.

9. The turntable of claim 8 wherein the base and the platform are each fabricated of a microwave compatible material, and the drive motor and the shielding enclosure are mounted on the base.

10. A portable, self-contained turntable for use in the cavity of a microwave oven, comprising a rotatively mounted food supporting platform, a drive motor having a metallic drive spring operably connected to the platform, and means reflective to microwave energy enclosing the drive spring and shielding the drive spring from microwave energy in the oven cavity.

* * * * *